(12) United States Patent
Kim

(10) Patent No.: US 7,061,541 B2
(45) Date of Patent: Jun. 13, 2006

(54) APPARATUS AND METHOD FOR COMPENSATING A COLOR CARRIER OF AN IMAGE SIGNAL

(75) Inventor: Hak Jae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 568 days.

(21) Appl. No.: 10/429,826

(22) Filed: May 6, 2003

(65) Prior Publication Data

US 2003/0223014 A1    Dec. 4, 2003

(30) Foreign Application Priority Data

May 29, 2002    (KR) ................ 2002-29957

(51) Int. Cl.
*H04N 9/45*    (2006.01)
(52) U.S. Cl. ................ 348/505; 348/536; 348/549
(58) Field of Classification Search ........... 348/505, 348/536, 537, 539, 549, 572, 573; 375/327, 375/376; H04N 9/45, 9/455
See application file for complete search history.

(56) References Cited

U.S. PATENT DOCUMENTS 6,380,980 B1 *    4/2002    Huang .................. 348/505

FOREIGN PATENT DOCUMENTS

| JP | 10-210492 | 8/1998 |
|----|-----------|--------|
| JP | 11-355796 | 12/1999 |

* cited by examiner

*Primary Examiner*—Sherrie Hsia
(74) *Attorney, Agent, or Firm*—Staas & Halsey LLP

(57) ABSTRACT

An apparatus to compensate a color carrier in an image processing system to convert an input analog image signal into a digital image signal includes a detector, a phase-locked loop unit, a difference detector, and a color signal processor. The detector detects a frequency of the color carrier in a color signal of the digital image signal. The phase-locked loop unit generates a subcarrier frequency by performing a phase-locked loop operation on a system clock signal applied to the image processing system. The difference detector detects a difference between the frequency of the color carrier and the subcarrier frequency. The color signal processor compensates for a phase deviation of the color carrier of the color signal using the subcarrier frequency generated by the phase-locked loop unit.

18 Claims, 3 Drawing Sheets

APPARATUS AND METHOD FOR COMPENSATING A COLOR CARRIER OF AN IMAGE SIGNAL

CROSS-REFERENCE TO RELATED APPLICATIONS

This application claims the priority of Korean Patent Application No. 2002-29957, filed May 29, 2002, which is incorporated herein in its entirety by reference.

BACKGROUND OF THE INVENTION

1. Field of the Invention

The present invention relates to an apparatus and method to compensate a color carrier of an image signal, and more particularly, to an apparatus and method to automatically compensate for a phase deviation of a color carrier of an image signal when converting an analog image signal to a digital image signal.

2. Description of the Related Art

Referring to FIG. 1, in order to convert an input analog image signal to a digital image signal, a conventional image processing system includes a phase-locked loop (PLL) unit 100, an analog-to-digital converter (ADC) 110, a comb filter 120, a color signal processor 130, and a format converter 140. The image processing system shown in FIG. 1 is referred to as a video decoder.

The PLL unit 100 includes a PLL1 101 and a PLL2 102 and generates signals by phase locking an input system clock signal to desirable frequencies. In other words, the PLL1 101 generates a sampling clock signal suitable for the ADC 110, and the PLL2 102 generates a fixed subcarrier signal to be used by the color signal processor 130.

The ADC 110 converts the input analog image signal into the digital image signal in response to the sampling clock signal provided from the PLL1 101 and outputs the digital image signal to the comb filter 120. The comb filter 120 divides the digital image signal into a luminance signal Y and a color signal C. The color signal processor 130 compensates for a phase deviation of a color carrier of the color signal C received from the comb filter 120 based on the subcarrier signal received from the PLL2 102. The format converter 140 converts the color signal received from the color signal processor 130 and the luminance signal Y received from the comb filter 120 into an appropriate output format and outputs a result indicative thereof. An image signal output from the format converter 140 is the digital image signal.

As described above, when the conventional image processing system converts the input analog image signal to a digital image signal, the color signal processor 130 compensates for the phase deviation of the color carrier, i.e., a reference signal for color, using the fixed subcarrier frequency generated from the PLL2 102. Accordingly, when the phase deviation of the color carrier included in an input image signal goes beyond a predetermined standard deviation range due to changes in an external environment, or when the phase of a subcarrier goes beyond a standard tuning range due to a deviation of a load cap of an oscillation device, the color signal processor 130 cannot exactly compensate for the phase deviation of the color carrier; thereby generating problems, such as the color of the output image signal may be changed, or a black and white image signal may be displayed. Changes in the external environment may include defects in a recording medium, such as a tape.

SUMMARY OF THE INVENTION

The present invention provides an apparatus and method to exactly compensate for a phase deviation of a color carrier regardless of changes in an external environment of an image processing system or operating deviations of peripheral parts.

In one aspect of the present invention, there is provided an apparatus to compensate a color carrier in an image processing system to convert an input analog image signal into a digital image signal. The apparatus includes a detector to detect a frequency of the color carrier in a color signal of the digital image signal; a phase-locked loop unit to generate a subcarrier frequency by performing a phase-locked loop operation on a system clock signal applied to the image processing system; a difference detector to detect a difference between the frequency of the color carrier and the subcarrier frequency; and a color signal processor to compensate for a phase deviation of the color carrier of the color signal using the second frequency generated by the phase-locked loop unit.

The difference detector detects the difference between the frequency of the color carrier and the subcarrier frequency within a period of either a horizontal or vertical synchronizing signal of the input image signal.

In another embodiment of the present invention, there is provided a method of compensating a color carrier in an image processing system that converts an input analog image signal into a digital image signal. The method includes setting a color carrier compensation mode; detecting the color carrier included in the input digital image signal when the color carrier compensation is set; performing a phase-locked loop operation on a system clock signal to generate a frequency of a subcarrier; detecting a difference between a frequency of the color carrier and the frequency of the subcarrier; and compensating for a phase deviation of the color carrier using the detected difference.

The phase deviation of the color carrier is compensated with a period of either a horizontal synchronizing signal or vertical synchronizing signal of the input image signal.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
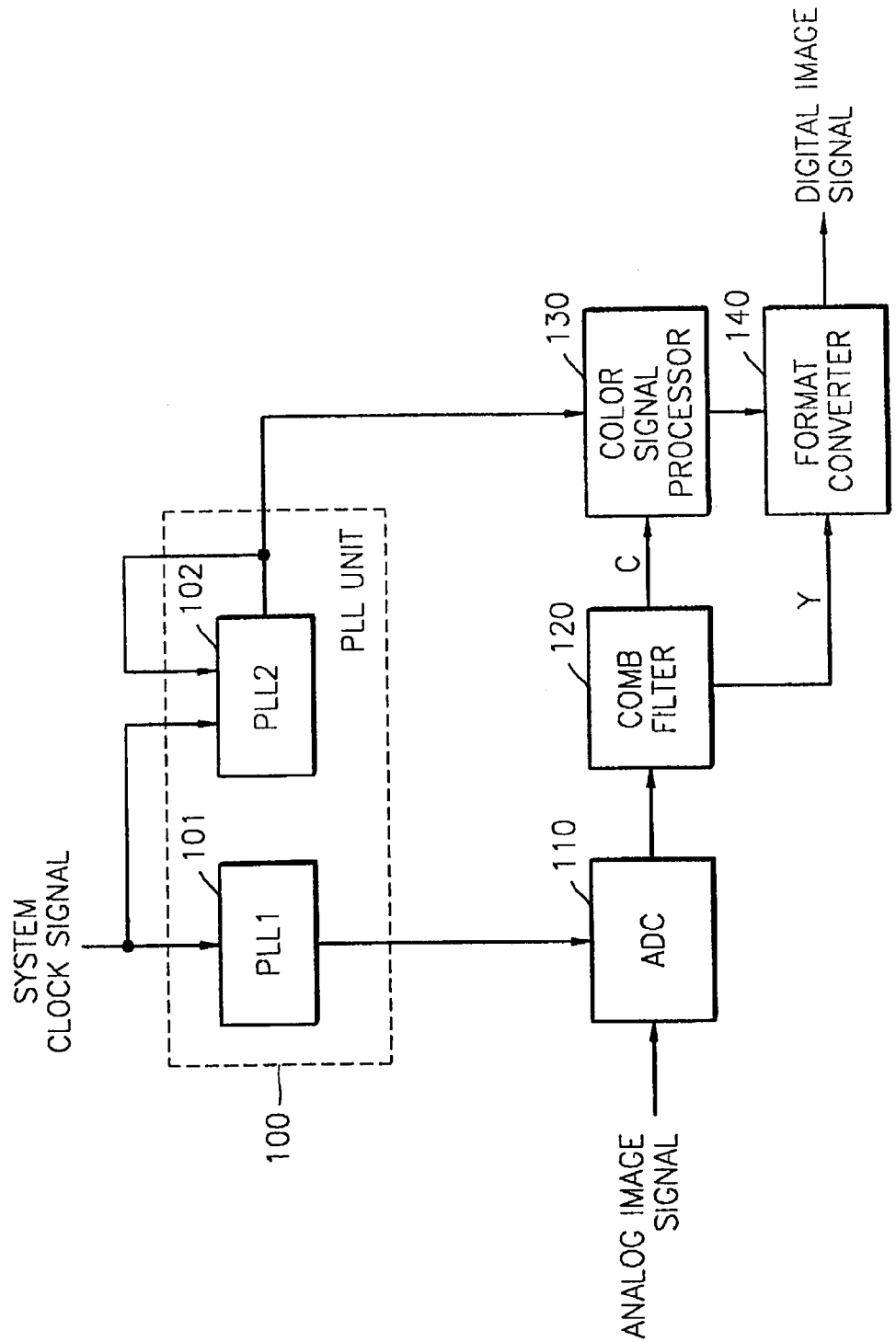
FIG. 1 is a block diagram of a conventional image processing system.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
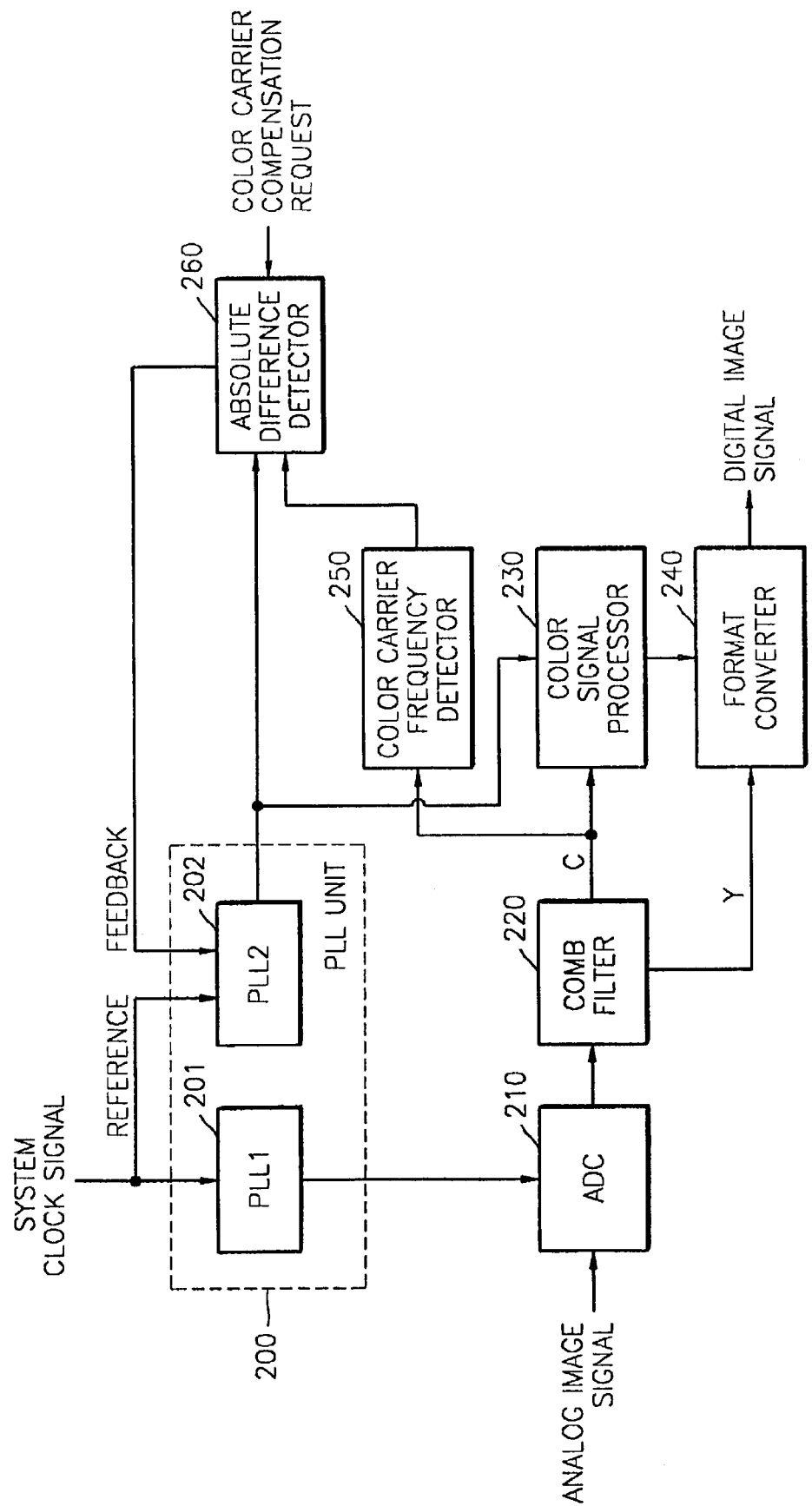
FIG. 2 is a block diagram of an image processing system with an apparatus to compensate a color carrier of an image signal, according to an embodiment of the present invention.

FIG. 2 is a block diagram of an image processing system with an apparatus to compensate a color carrier of an image signal, according to an embodiment of the present invention. Referring to FIG. 2, the image processing system, according to an embodiment of the present invention, includes a phase-locked loop (PLL) unit 200, an analog-to-digital converter (ADC) 210, a comb filter 220, a color signal processor 230, a format converter 240, a color carrier frequency detector 250, and an absolute difference detector 260.

Similar to the PLL unit 100 shown in FIG. 1, the PLL unit 200 includes a PLL1 201 and a PLL2 202. The PLL1 201 operates in a similar manner as the PLL1 101 shown in FIG. 1 and generates a sampling clock signal. Similar to the PLL2 102 shown in FIG. 1, the PLL2 202 operates using an input system clock signal as a reference signal. However, the PLL2 202 receives an output signal from the absolute difference detector 260 as a feedback signal. Accordingly, the PLL2 202 performs a phase-locked-loop operation on the input system clock signal received as the reference signal and the output signal from the absolute difference detector 260 received as the feedback signal and outputs a result of the phase-locked-loop operation as a subcarrier. The subcarrier is transmitted to the absolute difference detector 260 and the color signal processor 230.

The ADC 210 and the comb filter 220 operate in a similar manner as the ADC 110 and the comb filter 120 shown in FIG. 1, respectively. A color signal C is divided by the comb filter 250 and is transmitted to the color signal processor 230 and the color carrier frequency detector 250. A luminance signal Y is divided by the comb filter 250 and is transmitted to the format converter 240.

The color carrier frequency detector 250 detects a frequency of the color carrier included in the color signal C. The color carrier is transferred using a predetermined section of the color signal C, where the color carrier frequency detector 250 detects the frequency of the color carrier by detecting a frequency of the color signal C in the predetermined section. The color carrier frequency detector 250 outputs the detected frequency of the color carrier to the absolute difference detector 260.

The absolute difference detector 260 detects an absolute difference between a frequency of the subcarrier transmitted from the PLL2 202 and the frequency of the color carrier transmitted from the color carrier frequency detector 250. If an operating deviation does not occur in parts of the input system clock signal and environmental conditions of receiving signals do not create a deviation in the color carrier, a zero value is detected as the absolute difference. However, if the operating deviation occurs in the system clock signal and/or the environmental conditions of the receiving signals create a deviation in the color carrier, a nonzero value is detected as the absolute difference. The detected absolute difference is provided to the PLL2 202 as the feedback signal.

The absolute difference detector 260 detects the absolute difference whenever a color carrier compensation request signal is input. The color carrier compensation request signal can be periodically provided from a system controller (not shown). For example, the system controller can be set to generate the color carrier compensation request signal with a period of either a horizontal synchronizing signal or a vertical synchronizing signal of the input image signal. Accordingly, the color carrier of the changing input image signal is compensated in real time, so the phase of the color carrier can be optimized with a minimum load on the system controller. The system controller can be realized as a microcomputer controlling the functions of the entire image processing system.

The color signal processor 230 compensates for the phase deviation of the color carrier of the color signal C based on the subcarrier received from the PLL2 202. The color signal, for which the phase deviation of the color carrier has been compensated for, is output to the format converter 240. The format converter 240 operates in a similar manner as the format converter 140 shown in FIG. 1.

Figure 3:
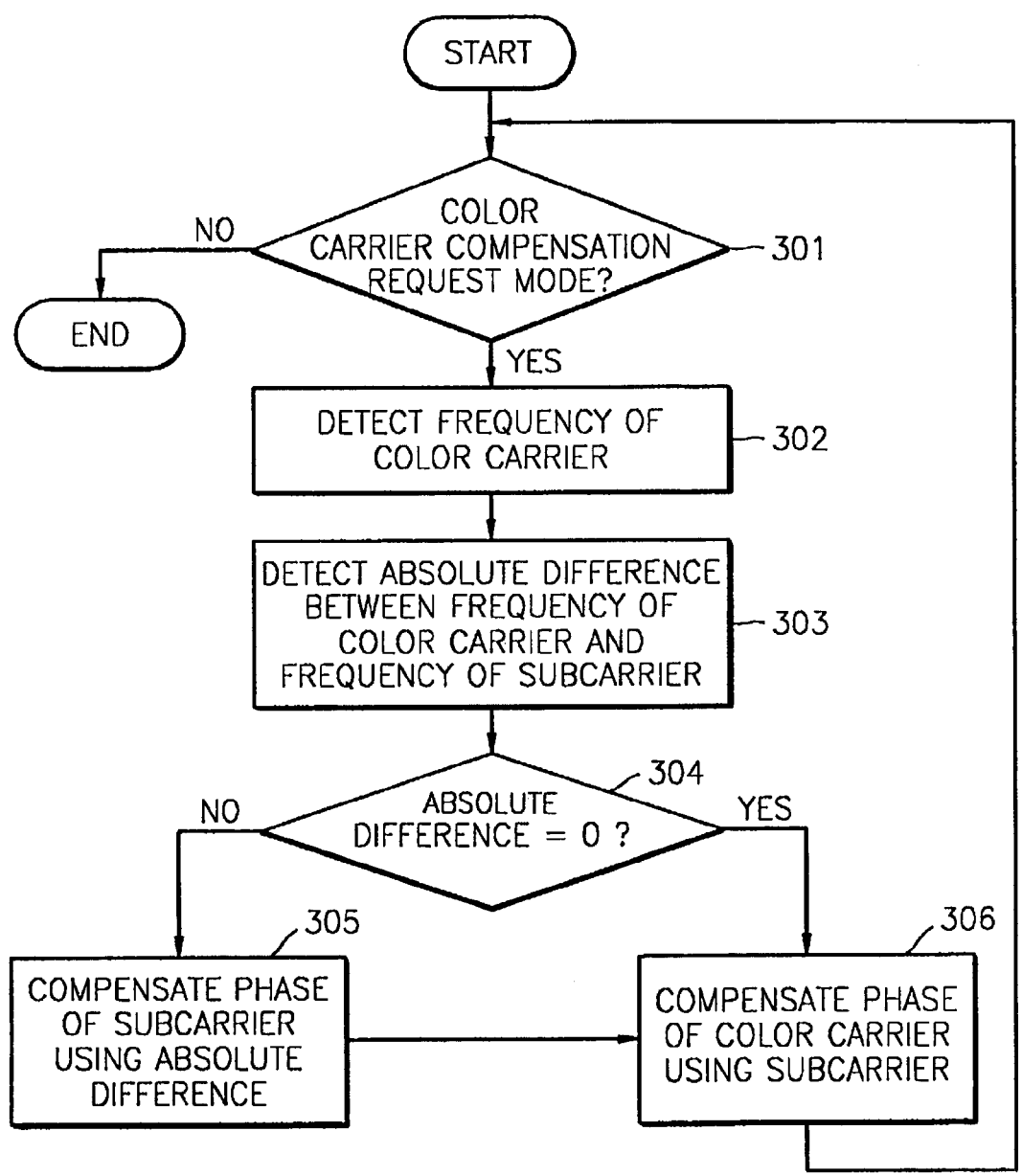
FIG. 3 is a flowchart of a method to compensate the color carrier of the image signal, according to an embodiment of the present invention.

FIG. 3 is a flowchart of a method to compensate the color carrier of the image signal, according to an embodiment of the present invention. Referring to FIG. 3, at operation 301, if it is determined that the color carrier compensation request mode has been set, at operation 302, the frequency of the color carrier included in a currently input image signal is detected. As shown in FIG. 2, the frequency of the color carrier can be continuously detected during the operation of the image processing system regardless of the color carrier compensation request mode.

At operation 303, an absolute difference between the frequency of the color carrier and the frequency of the subcarrier obtained using the PLL2 202 is detected. At operation 304, it is determined whether the detected absolute difference is 0. If it is determined that the detected absolute difference is nonzero, it is necessary to compensate for the phase deviation of the color carrier. At operation 305, the phase deviation of the subcarrier generated from the PLL2 202 is compensated using the absolute difference. Next, at operation 306, the phase deviation of the color carrier included in a color signal is compensated using the phase compensated subcarrier, and then operation 301 is performed.

If it is determined that the color carrier compensation request mode has not been set in operation 301, the operation ends. Whether the color carrier compensation request mode has been set can be determined according to the color carrier compensation request signal described in FIG. 2. Accordingly, all of the operations shown in FIG. 3 can be performed within a period of either the horizontal or the vertical synchronizing signal of the input image signal. Alternatively, as shown in FIG. 2, only operation 303 can be performed with the period of either the horizontal or the vertical synchronizing signal of the input image signal.

In the meantime, if the absolute difference is 0, operation 306 is immediately performed so that the phase deviation of the color carrier of the color signal is compensated using the subcarrier currently generated from the PLL2 202.

According to an embodiment of the present invention, even when a phase deviation of a color carrier included in an input image signal goes beyond a standard deviation range due to changes in an external environment, or even when a phase deviation of a subcarrier obtained through a phase-locked loop goes beyond a predetermined standard deviation range due to an operating deviation of peripheral parts, a color signal processor can exactly compensate for the phase deviation of the color carrier in real time. Therefore, even if conditions of receiving an image signal or operating conditions of the system are not satisfactory, the color of an image can be exactly reproduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to compensate a color carrier in an image processing system to convert an input analog image signal into a digital image signal, the apparatus comprising:
   a detector to detect a frequency of the color carrier in a color signal of the digital image signal;
   a phase-locked loop unit to generate a subcarrier frequency by performing a phase-locked loop operation on a system clock signal applied to the image processing system;
   a difference detector to detect a difference between the frequency of the color carrier and the subcarrier frequency; and
   a color signal processor to compensate for a phase deviation of the color carrier of the color signal using the subcarrier frequency generated by the phase-locked loop unit.

2. The apparatus of claim 1, wherein the difference detector detects the difference within a predetermined period.

3. The apparatus of claim 2, wherein the predetermined period is a period of a horizontal synchronizing signal of the input image signal or a period of a vertical synchronizing signal of the input image signal.

4. The apparatus of claim 3, wherein the color carrier of the changing input image signal is compensated in real time.

5. The apparatus of claim 1, wherein the difference detected by the difference detector is an absolute difference.

6. The apparatus of claim 5, wherein when the detected absolute difference is a nonzero value the phase deviation of the color carrier is compensated.

7. The apparatus of claim 5, wherein when the detected absolute difference is a zero value, an operating deviation does not occur in parts of the system clock signal and environmental conditions of input image signals do not create a deviation in the color carrier.

8. The apparatus of claim 1, wherein the difference detector provides the detected difference to the phase-locked loop unit as a feedback signal.

9. The apparatus of claim 8, wherein the phase-locked loop unit performs the phase-locked-loop operation on the system clock signal as a reference signal and an output signal from the difference detector as the feedback signal and outputs a result indicative thereof as the subcarrier frequency.

10. The apparatus of claim 1, further comprising:
    a comb filter to divide and transmit a color signal C to the color signal processor and the detector.

11. The apparatus of claim 10, further comprising:
    a format converter, wherein the comb filter divides and transmits a luminance signal Y to the format converter.

12. The apparatus of claim 10, wherein the detector detects the frequency of the color carrier included in the color signal C.

13. The apparatus of claim 12, wherein the detector detects the frequency of the color carrier by detecting a frequency of the color signal C in a predetermined section thereof.

14. The apparatus of claim 13, wherein when an operating deviation does not occur in parts of the system clock signal and environmental conditions of input image signals do not create a deviation in the color carrier, a zero value is detected as the difference.

15. The apparatus of claim 13, wherein when an operating deviation does occur in parts of the system clock signal and/or environmental conditions of input image signals create a deviation in the color carrier, a nonzero value is detected as the difference.

16. A method of compensating a color carrier in an image processing system that converts an input analog image signal into a digital image signal, the method comprising:
    setting a color carrier compensation mode;
    detecting the color carrier included in the input digital image signal when the color carrier compensation is set;
    performing a phase-locked loop operation on a system clock signal to generate a frequency of a subcarrier;
    detecting a difference between a frequency of the color carrier and the frequency of the subcarrier; and
    compensating a phase deviation of the color carrier using the detected difference.

17. The method of claim 16, wherein the phase deviation of the color carrier is compensated within a predetermined period.

18. The method of claim 17, wherein the predetermined period is a period of a horizontal synchronizing signal of the input image signal or a period of a vertical synchronizing signal of the input image signal.

* * * * *